United States Patent [19]
Sridharan et al.

[11] Patent Number: 6,105,394
[45] Date of Patent: Aug. 22, 2000

[54] GLASS ENAMEL FOR AUTOMOTIVE APPLICATIONS

[75] Inventors: Srinivasan Sridharan, Strongsville; Robert P. Blonski, North Royalton, both of Ohio; Hasan B. Emlemdi, Pittsburgh, Pa.; Gordon J. Roberts, Parma; Ivan H. Joyce, Hudson, both of Ohio

[73] Assignee: Ferro Corporation, Cleveland, Ohio

[21] Appl. No.: 09/228,702

[22] Filed: Jan. 12, 1999

[51] Int. Cl.[7] ............................. C03C 8/24; C03C 17/04; C03C 10/00
[52] U.S. Cl. ............................. 65/33.6; 65/33.1; 501/14; 501/16; 501/17; 501/20; 501/21; 501/32
[58] Field of Search .................... 65/33.1, 33.6; 501/14, 15, 16, 17, 20, 21, 26, 32, 55

[56] References Cited

U.S. PATENT DOCUMENTS

| | | | |
|---|---|---|---|
| 4,554,258 | 11/1985 | Francel | 501/21 |
| 4,859,637 | 8/1989 | Roberts | 501/79 |
| 4,882,301 | 11/1989 | Gettys et al. | 501/17 |
| 5,153,150 | 10/1992 | Ruderer et al. | 501/17 |
| 5,203,902 | 4/1993 | Murkens | 65/60.53 |
| 5,208,191 | 5/1993 | Ruderer et al. | 501/17 |
| 5,252,521 | 10/1993 | Roberts | 501/17 |
| 5,262,363 | 11/1993 | Yoshida et al. | 501/17 |
| 5,286,270 | 2/1994 | Ruderer et al. | 65/33 |
| 5,306,674 | 4/1994 | Ruderer et al. | 501/70 |
| 5,308,803 | 5/1994 | Clifford et al. | 501/17 |
| 5,326,591 | 7/1994 | Roberts | 427/162 |
| 5,350,718 | 9/1994 | Anquetil et al. | 501/21 |
| 5,470,506 | 11/1995 | Tanigami et al. | 252/518 |
| 5,504,045 | 4/1996 | Emlendi et al. | 501/16 |
| 5,578,533 | 11/1996 | Manabe et al. | 501/17 |
| 5,616,417 | 4/1997 | Ryan | 428/428 |
| 5,629,247 | 5/1997 | Prunchak | 501/26 |
| 5,677,251 | 10/1997 | Sakoske | 501/17 |
| 5,707,909 | 1/1998 | Heitmann et al. | 501/59 |
| 5,710,081 | 1/1998 | Tünker | 501/21 |
| 5,714,420 | 2/1998 | Sakoske et al. | 501/14 |
| 5,747,395 | 5/1998 | Smith et al. | 501/5 |
| 5,753,685 | 5/1998 | Sakoske | 427/376.2 |
| 5,782,945 | 7/1998 | Gavin et al. | 65/60.1 |
| 5,783,507 | 7/1998 | Sakoske | 501/17 |
| 5,817,586 | 10/1998 | Harada et al. | 501/17 |

Primary Examiner—Stanley S. Silverman
Assistant Examiner—Jacqueline A. Ruller
Attorney, Agent, or Firm—Rankin, Hill, Porter & Clark LLP

[57] ABSTRACT

The present invention provides lead and cadmium free glass enamel compositions. In one embodiment of the invention, glass frits include from about 0.1 percent by weight to about 15 percent by weight $Nb_2O_5$, less than about 3 percent by weight alkali metal oxides, less than about 3 percent by weight ZnO, less than about 1 percent by weight $B_2O_3$, and precursors from which $Bi_2SiO_5$ can be crystallized upon firing, said precursors including $Bi_2O_3$ and $SiO_2$. Glass frits according to the present invention preferably further include up to about 25 percent by weight of coloring oxides, such as $CeO_2$, $Co_3O_4$, $In_2O_3$, SnO, $Cr_2O_3$, CuO, $Fe_2O_3$, $MnO_2$, $MoO_3$, NiO, and $V_2O_5$. By incorporating various amounts of coloring oxides into the compositions, the degree of crystallization and the rate at which crystallization occurs upon firing of the compositions can be controlled. Compositions according to the present invention form enamels upon firing which exhibit excellent resistance to acids, water, and alkalis as compared to enamels formed from prior art lead and cadmium free glass enamel compositions.

15 Claims, No Drawings

GLASS ENAMEL FOR AUTOMOTIVE APPLICATIONS

FIELD OF INVENTION

The present invention concerns compositions for use in producing glass enamels and methods of using the same. More particularly, the invention concerns crystallizing and noncrystallizing lead and cadmium free glass frit compositions for use in automotive applications that fuse at low temperatures and can be used to form glass enamels that exhibit excellent chemical resistance.

BACKGROUND

It is known that the use of PbO as an ingredient in a glass enamel composition tends to lower the firing temperature of the composition and produce an enamel that has a superior surface finish. For this and other reasons, PbO was a significant component in many prior art glass enamel compositions. However, in light of recent health and environmental restrictions and concerns, the use of PbO and other potentially toxic metal oxides, such as CdO, in glass enamel compositions is now largely avoided whenever possible. A need exists in the glass enamel industry for crystallizing and noncrystallizing lead and cadmium free enamel compositions that fuse at low temperatures and form enamels which are resistant to acids, water and alkalis.

One particular application for lead and cadmium free glass enamel compositions that fuse at low temperatures is the formation of opaque, dark colored enamel bands on sections of automotive glass, such as windshields and side and rear windows. Automotive manufacturers have found that the appearance of a section of glass is greatly enhanced by applying a relatively narrow, opaque, dark colored enamel band around one or more edges of a section of glass on the inner surface thereof. This band may vary anywhere from about one inch to about six inches in width. In addition to imparting an aesthetically appealing appearance to the section of glass, these opaque, colored enamel bands preferably block the transmission of sunlight and thereby prevent the degradation of underlying adhesives by ultraviolet radiation (hereinafter "UV"). Moreover, these opaque colored enamel bands preferably conceal a section of the silver-containing buss bars and wiring connections of rear glass defrosting systems from view from the outside of the vehicle.

As noted in Gettys et al. U.S. Pat. No. 4,882,301, the specification of which is hereby incorporated by reference, glass sections for automotive applications are many times produced with varying degrees of curvature as opposed to flat, planar surfaces. If a curvature is desired in a given section of glass, it is heated to a temperature in the vicinity of about 1,300° F. (about 700° C.) at which point it is ready to be subjected to a bending or curving stress employing any number of suitable molding or pressing techniques. At that temperature, the section of glass maintains sufficient stiffness such that the press head of the equipment employed to bend or curve the glass or the vacuum head utilized to pick up and transport the section of glass does not disturb the surface of the glass with which it contacts.

It was discovered several years ago that specially formulated glass enamel compositions could be applied to planar sections of glass to form opaque, dark colored enamel bands at the same time as the bending or forming operations were performed on the section of glass. As set forth in U.S. Pat. No. 4,882,301, these glass enamel compositions had the ability to fuse and partially crystallize at the temperature at which a section of glass would be preheated preparatory to a bending or forming operation. It is believed that the partial crystallization of the enamel forms a dense, hard, protective layer which prevents the enamel from sticking to the press or vacuum head during the glass bending and transporting operations.

Generally speaking, prior art enamel systems suitable for use in such automotive applications fit within one of five broad categories or types. The first category relates to lead and/or cadmium based enamel systems which partially crystallize upon firing. The enamel systems disclosed in U.S. Pat. No. 4,882,301 are representative of this type. The second category relates to lead and cadmium free enamel systems which include crystalline seed materials to promote partial crystallization of the enamel upon firing. The enamel systems disclosed in Ruderer et al. U.S. Pat. No. 5,153,150, Ruderer et al. U.S. Pat. No. 5,208,191, Sakoske U.S. Pat. No. 5,677,251, Sakoske et al. U.S. Pat. No. 5,714,420, Sakoske U.S. Pat. No. 5,753,685, and Sakoske U.S. Pat. No. 5,783,507 are representative of this type.

The third category relates to lead and cadmium free enamel systems which include substantial amounts of $Bi_2O_3$, but little if any ZnO. The enamel systems disclosed in Murkens U.S. Pat. No. 5,203,902 and Manabe et al. U.S. Pat. No. 5,578,533 are representative of this type. The fourth category relates to lead and cadmium free enamel systems which include substantial amounts of ZnO, but little $Bi_2O_3$. The enamel systems disclosed in Ruderer et al. U.S. Pat. No. 5,306,674, Anquetil et al. U.S. Pat. No. 5,350,718, Emlemdi et al. U.S. Pat. 5,504,045, Heitmann et al. U.S. Pat. No. 5,707,909, and Harada et al. U.S. Pat. No. 5,817,586 are representative of this type. The fifth category relates to lead and cadmium free enamel systems which include both $Bi_2O_3$ and ZnO as essential components. The enamel systems disclosed in Roberts U.S. Pat. No. 5,252,521, Ryan U.S. Pat. No. 5,616,417, and Punchak U.S. Pat. No. 5,629,247 are representative of this type.

Although improvements have been made in recent years, the chemical durability of known lead and cadmium free glass enamel systems for automotive applications has been less than desired. Therefore, a need exists for enamel compositions for automotive applications which exhibit excellent chemical durability to acids, water, and alkalis. Such enamel compositions must be able to fuse and preferably, partially crystallize at temperatures at which sections of glass are preheated preparatory to forming operations so as not to stick to press or vacuum heads. Moreover, such enamel compositions should be effective in blocking ultraviolet radiation and in retarding the migration of silver and subsequent showing from overprinted buss bars and wiring connections of rear glass defrosting systems.

SUMMARY OF THE INVENTION

The present invention provides new and useful lead and cadmium free glass enamel compositions which exhibit various distinct advantages over prior art glass enamel compositions. Compositions according to the present invention comprise a solids portion comprising a glass composition. The glass composition comprises one or more glass frits which include $Bi_2O_3$, $SiO_2$, and coloring oxides. Preferably, the compositions include from about 0.1 percent by weight to about 15 percent by weight $Nb_2O_5$, less than about 3 percent by weight alkali metal oxides, less than about 3 percent by weight ZnO, and less than about 1 percent by weight $B_2O_3$. Preferably, glass frits according to the present invention partially crystallize upon firing at about 1,250° F. for five minutes to form $Bi_2SiO_5$ which prevents the enamel from sticking to glass forming and handling equipment. Compositions according to the present invention are used to form enamels on glass substrates which exhibit excellent resistance to acids, water, and alkalis as compared to glass enamels formed from prior art lead and cadmium free enamel compositions.

The glass frit compositions (glass component) according to the present invention comprise from about 0.01 percent to about 25 percent by weight of coloring oxides, such as $CeO_2$, $Co_3O_4$, $Cr_2O_3$, CuO, $Fe_2O_3$, $MnO_2$, $MoO_3$, NiO, and $V_2O_5$, which reduce the transmission of UV radiation through the fired enamel. It has also been discovered that by incorporating various amounts of selected coloring oxides into the composition, the degree of crystallization and the rate at which crystallization occurs upon firing of the compositions can be controlled. For example, the incorporation of $Co_3O_4$, CuO, $MnO_2$, or mixtures of said oxides, tends to inhibit the formation of $Bi_2SiO_5$ crystals upon firing, whereas incorporation of $Cr_2O_3$ to glass enamels containing CuO enhances crystallization of $Bi_2SiO_5$. It has also been found that when the composition of a glass frit comprises more than about 5 percent by weight $MnO_2$, the formation of $Bi_2SiO_5$ crystals upon firing is completely inhibited. Thus, the ability of the enamel to block UV radiation and the ability of the enamel to crystallize upon firing can be controlled by adjusting the composition and concentration of coloring oxides. In addition, the incorporation of coloring oxides has the added benefit of reducing the overall concentration of the costly $Bi_2O_3$ and in the elimination, or substantial reduction, of the use of mill added inorganic pigments in the enamel composition.

It has also been discovered that great versatility in the optimization of enamels for specific firing and use applications can be obtained by combining more than one frit of the type disclosed above in an enamel. Optionally, other enamel components, such as pigments, fillers, and bus bar controlling additives, can be added in the enamel composition.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

As noted above, a need exists in the glass enamel industry for crystallizing and noncrystallizing lead and cadmium free glass enamel compositions that fuse at low temperatures and form enamels upon firing that are resistant to acids, water, and alkalis. As used throughout this specification in the claims below, the term "lead and cadmium free" means that no lead, or PbO, cadmium, or CdO, has been intentionally added to the composition, and that the composition comprises less than about 0.5 percent by weight PbO or CdO. The most durable known lead and cadmium free glass enamels barely meet the increasingly stringent chemical durability requirements of the glass enamel industry.

Compositions according to the present invention fuse upon firing for about five minutes at from about 1,050° F. to about 1,300° F. and form enamels that exhibit excellent chemical durability as compared to known glass enamels. Moreover, it has been discovered that the excellent durability of glass enamel compositions according to the present invention is not compromised when selected coloring oxides are incorporated into the compositions to improve the color and UV radiation blocking capability of the fired enamel. Moreover, it has been discovered that incorporation of coloring oxides into compositions according to the present invention has the added benefit of controlling the degree and rate of crystallization of the fired enamel.

Glass frits according to the present invention comprise $Bi_2O_3$, $SiO_2$, and from about 0.1 percent by weight to about 15 percent by weight $Nb_2O_5$. Moreover, glass frits according to the present invention comprise less than about 1 percent by weight $B_2O_3$, less than about 3 percent by weight alkali metal oxides, less than about 3 percent by weight ZnO, which are the known detrimental oxides for chemical durability in glass enamel systems. Preferably, there is no intentional addition of $F_2$, and the $F_2$ level is thus below about 0.5 percent by weight. Glass frits according to the present invention may comprise from about 20 percent by weight to about 80 percent by weight $Bi_2O_3$, from about 12 percent by weight to about 45 percent by weight $SiO_2$, from about 1 percent by weight to about 10 percent by weight $Nb_2O_5$, no $B_2O_3$, less than about 2 percent by weight alkali metal oxides, and less than about 2 percent by weight ZnO. For reasons which are not completely understood by the inventors, the incorporation of $Nb_2O_5$ into the frit significantly improves the chemical durability of the fired enamel. Without limiting the invention in any way, the inventors believe that $Nb_2O_5$ increases the chemical durability of the resultant glass enamel by strengthening the glass network and blocking the migration of mobile species. It has also been discovered that frits containing little or no $Na_2O$ exhibit better silver buss bar hiding abilities.

One preferred embodiment of the present invention comprises a crystallizable lead and cadmium free glass frit comprising from about 0.1 percent by weight to about 15 percent by weight $Nb_2O_5$, less than about 5 percent by weight BaO, less than about 3 percent by weight alkali metal oxides, less than about 3 percent by weight ZnO, less than about 1 percent by weight $B_2O_3$ (more preferably less than about 0.5 percent by weight $B_2O_3$), and precursors from which $Bi_2SiO_5$ crystals can be formed upon firing, said precursors comprising $Bi_2O_3$ and $SiO_2$. Preferably, the $Bi_2O_3$ comprises from about 20 percent by weight to about 80 percent by weight of the glass frit, and the $SiO_2$ comprises from about 12 percent by weight to about 45 percent by weight of said glass frit. More preferably, the $Bi_2O_3$ comprises from about 40 percent, and more preferably about 50 percent by weight to about 75 percent by weight of the glass frit, and the $SiO_2$ comprises from about 15 percent by weight to about 30 percent by weight of said glass frit.

Crystallizable glass frits according to this preferred embodiment of the present invention readily crystallize upon about 5 minutes heat treatment at about 1,250° F. and are thus suitable for use in automotive glass enameling applications. Although it is not necessary, crystallization can be promoted through the use of fluoride mill additions, such as $CaF_2$, but as stated above, $F_2$, levels in the glass frits should be held to a minimum. For automotive glass enameling applications, it is particularly important that a glass enamel composition flow and sinter before significant crystallization occurs during the short heat treatment cycle. Thus, it is more desirable to retard or delay or inhibit the degree and rate of crystallization during firing.

Preferably, various coloring oxides are incorporated into the glass composition or glass frits according to the present invention to produce dark colored glass enamels that effectively block the transmission of UV radiation. The frits or glass composition of the glass enamel preferably include at least from about 0.01, 1 or 2 percent by weight coloring oxides. Coloring oxides suitable for use in the present invention include any one or more of the coloring oxides selected from the group consisting of $CeO_2$, $SnO$, $In_2O_3$, $Co_3O_4$, $Cr_2O_3$, $CuO$, $Fe_2O_3$, $MnO_2$, $MoO_3$, $NiO$, and $V_2O_5$. Any one or a mixture of several coloring oxides can be included as part of the glass frits according to the present invention, but the sum of all coloring oxides should not exceed about 25 percent by weight of the glass composition, with such sum being comprised of up to about 10 percent by weight $CeO_2$, up to about 15 percent by weight $Co_3O_4$, up to about 10 percent by weight $Cr_2O_3$, up to about 15 percent by weight $CuO$, up to about 15 percent by weight $Fe_2O_3$, up to about 25 percent by weight $MnO_2$, up to about 5 percent by weight $MoO_3$, up to about 5 percent by weight $NiO$, up to about 5 percent by weight $V_2O_5$, up to about 10 percent by weight $In_2O_3$ and up to about 10 percent by weight $SnO$.

It has been discovered that the incorporation of some of the coloring oxides has the added benefit of retarding or inhibiting $Bi_2SiO_5$ crystallization during firing, whereas other coloring oxides promote crystallization. In particular, it has been discovered that $CuO$ and $MnO_2$ retard or inhibit the formation of $Bi_2SiO_5$ crystals during firing. In fact, it has been found that glass frits according to the present invention which comprise from about 5 percent by weight up to about 25 percent by weight $MnO_2$ do not crystallize upon firing at all and can thus be used to form a noncrystallizing glass frit. It has also been discovered that incorporation of $Cr_2O_3$ into glass frits containing $CuO$ tends to promote the formation of $Bi_2SiO_5$ crystallization. The mechanism for this phenomenon is not understood at this time.

Thus, through the selective incorporation of varying amounts of coloring oxides in glass frit compositions according to the present invention, significant control can be achieved over the competing processes of viscous sintering and crystallization. This control is particularly useful in producing enamels for automobile glass applications, because through the selective incorporation of coloring oxides in the glass frit or frits, the degree and rate of crystallization and thus the enamel's nonstick characteristics can be optimized in view of the enamel's flowing and sintering characteristics.

Incorporation of coloring oxides into the glass frits according to the present invention has the additional benefit of reducing or eliminating entirely the need to use mill added inorganic pigments to obtain a dark colored enamel. When mill added inorganic pigments are used, incorporation of coloring oxides in the glass frits help to retard the chemical driving force for the pigments to dissolve into the glass, which can adversely affect the firing characteristics of the enamel. An additional benefit to incorporating coloring oxides in the glass frits is the reduction in the amount of the costly $Bi_2O_3$ used.

It will be appreciated that compositions for use in forming glass enamels according to the present invention may comprise more than one glass frit. In one preferred embodiment, a composition for use in forming a glass enamel comprises a crystallizable glass frit portion and a noncrystallizable glass frit portion. In another preferred embodiment, the crystallizable glass frit portion may comprise two or more glass frits as specified above with different compositions. The crystallizable glass frit portion comprises at least about 10 percent by weight of the solids portion of the enamel composition. As used in this specification and the claims below, the term "solids portion" means that part of the enamel composition that survives firing. Thus, the solids portion comprises the inorganic glass frits, fillers and pigments that comprise the enamel composition. Preferably, the crystallizable glass frit comprises at least about 15 percent by weight of the solids portion of the enamel composition. More preferably, the crystallizable glass frit comprises from about 15 percent by weight to about 100 percent by weight of the solids portion of the enamel composition.

In addition to the lead and cadmium free glass composition portion, the enamel composition according to the present invention may also include one or more inorganic pigments, one or more noncrystallizable glass frits, one or more fillers and a suitable vehicle or carrier which allows the enamel composition to take the form appropriate for application of the enamel composition to a section of glass such as, for example, a slurry, a paste or a thermoplastic pellet.

In another preferred embodiment, the solids portion of enamel compositions according to the present invention comprise from about 5 percent by weight to about 95 percent by weight of one or more lead and cadmium free crystallizable glass frits, from about 0 percent by weight to about 95 percent by weight of one or more lead and cadmium free noncrystallizable glass frits, up to about 30 percent by weight of inorganic pigments, and up to about 25 percent by weight of crystalline fillers. The lead and cadmium free noncrystallizable glass frits comprise from about 20 percent to about 80 percent by weight $Bi_2O_3$, from about 0.1 percent by weight to about 15 percent by weight $Nb_2O_5$, from about 12 percent to about 45 percent by weight $SiO_2$, less than about 3 percent by weight alkali metal oxides, less than about 3 percent by weight ZnO, and preferably less than about 1 percent by weight $B_2O_3$. Coloring oxides, as discussed above, may be included in the noncrystallizable glass frit. In a further embodiment of the present invention the noncrystallizable glass frit comprises from about 50 percent to about 75 percent by weight $Bi_2O_3$, from about 1 to about 10 percent by weight $Nb_2O_5$, less than about 5 percent by weight BaO, and up to about 0.5 percent by weight $B_2O_3$. It will be appreciated that in certain applications, for example, where nonstick properties are not required, a suitable glass enamel could be produced that only utilizes a noncrystallizable glass frit. Use of a crystallizable glass frit may not be required for every application.

The enamel composition is utilized in the production of a section of formed decorated glass by first mixing the crystallizable glass frit and one or more fillers, vehicles, noncrystallizable glass frits and pigments if so desired, so as to produce a form appropriate for application of the enamel composition to a section of glass. The vehicle or carrier preferably comprises a solvent and a resin. Optionally, the vehicle or carrier may also comprise a thixotrope and a wetting agent in order to facilitate the application of the enamel composition to the section of glass.

Examples of potential suitable resins include ethyl cellulose, ethyl hydroxy ethyl cellulose, wood rosin, mixtures of ethyl cellulose and phenolic resins, polymethacrylates of lower alcohols and monobutyl ether of ethylene glycol monoacetate.

Examples of potential suitable solvents include terpenes such as alpha- or beta-terpineol or mixtures thereof with other solvents such as kerosene, dibutyl phthalate, butyl carbitol, butyl carbitol acetate, hexylene glycol and high-boiling alcohols and alcohol esters. Various combinations of these and other solvents may be formulated to obtain the desired viscosity and volatility requirements for each application.

Examples of potential suitable thixotropic agents include organic based thixotropics such as, for example, hydrogenated castor oil and derivatives thereof and ethyl cellulose.

Examples of potential suitable wetting agents include fatty acid esters, for example, N-tallow-1,3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine di-oleate.

Examples of potential suitable pigments include copper chrome black sold under the trade designation K-393, iron nickel manganese chrome black sold under the trade designation 1750, cobalt aluminate blue sold under the trade designation V-3285, zinc iron chrome brown sold under the trade designation K-100, and iron cobalt chrome black sold under the trade designation F-6340, all sold by the Ferro Corporation of Cleveland, Ohio. Pigments generally account for up to about 20 percent, or up to about 30 percent by weight of the solids portion of the enamel composition.

Examples of potential suitable fillers include alumina ($Al_2O_3$), buss bar hiding control agents such as fine silicon powders (up to about 3 percent by weight), zircon, cordierite ($Mg_2Al_4Si_5O_{18}$), willemite ($Zn_2SiO_4$), beta-eucryptite ($LiAlSiO_4$), transition metal oxides such as FeO and silicon dioxide ($SiO_2$). Fillers generally comprise up to about 25 percent by weight of the solids portion of the enamel composition.

The solids portion of the enamel composition comprises at least about 40 percent by weight of the enamel composition. Preferably, the solids portion comprises at least about 60 percent by weight of the enamel composition. More preferably, the solids portion comprises at least about 70 percent by weight of the enamel composition.

Subsequent to the application of the enamel composition the section of glass is then heated to a temperature of from about 900° F. to about 1400° F. and then formed to a desired shape. Generally, the step of heating and forming the section of glass is carried out simultaneously or at substantially the same time. Such forming may be carried out utilizing a press device which may include a head covered with a material such as FIBERFRAX refractory fiber. FIBERFRAX is a registered trademark for refractory fiber owned by the Stemcor Corporation of Cleveland, Ohio.

During the forming operation the refractory fiber contacts the layer of enamel composition and the applicants believe that the crystallization of $Bi_2SiO_5$ that occurs during heating helps to prevent the refractory fiber from sticking to the composition and/or causing the surface of the resultant enamel finish produced by the enamel composition from becoming disrupted or disturbed. Similarly, generally the vacuum head utilized to transport the glass is covered with a refractory fiber such as FIBERFRAX refractory fiber and applicants believe that the crystallization that occurs during heating helps to prevent the refractory fiber from sticking to the enamel composition and/or causing the surface of the resultant enamel finish from becoming disrupted or disturbed.

The following examples are intended only to illustrate the invention and should not be construed as imposing limitations upon the claims:

EXAMPLE 1

Glass frits I, II, III, and IV were prepared using conventional glass making techniques such that they had the following compositions by weight percent:

| Oxide | I | II | III | IV |
|---|---|---|---|---|
| $Bi_2O_3$ | 70.33 | 63.94 | 62.79 | 63.94 |
| $SiO_2$ | 21.25 | 19.32 | 18.97 | 19.32 |
| $Nb_2O_5$ | 3.10 | 2.82 | 2.77 | 2.82 |
| $Li_2O$ | 0.50 | 0.45 | 0.45 | 0.45 |
| $Na_2O$ | 0.97 | 0.88 | 0.87 | 0.88 |
| BaO | 1.48 | 1.34 | 1.31 | 1.34 |
| ZnO | 2.37 | 2.15 | 2.12 | 2.15 |
| $Cr_2O_3$ | — | 4.55 | 4.46 | 4.55 |
| CuO | — | 4.55 | 4.46 | — |
| $Co_3O_4$ | — | — | 1.80 | — |
| $MnO_2$ | — | — | — | 4.55 |
| Total | 100.0 | 100.0 | 100.0 | 100.0 |

Glass frits I, II, III and IV were each milled to an average particle size of from about 2 to about 6 microns and then dispersed into a C31 medium (available from Ferro Corporation of Cleveland, Ohio) and milled in a Mueller mill for about 10 minutes. The weight ratio of solids to medium was about 7.5. The compositions were each screen printed onto 5 cm by 10 cm by 4 mm thick automobile back light coupons (on the tin side) using a 160 mesh screen to a wet print thickness of about 1.2 to about 1.5 mils. The compositions were dried in a forced air oven at about 185° F. for about 30 minutes and then heat treated for about 4 to about 8 minutes in an oven held at 1,250° F. The following properties were measured for each of the four glass frits as compared to a standard lead containing automotive glass frit made by Ferro Corporation as PF75, and a standard zinc-borosilicate automotive glass frit made by Ferro Corporation as LF256:

| Property | I | II | III | IV | PF75 | LF256 |
|---|---|---|---|---|---|---|
| CTE × $10^{-7}$/° C. (RT - 300° C.) | 85.1 | 82.7 | 80.9 | 76.7 | 77.7 | 89.0 |
| Fusion Temperature (° C.) | 540 | 560 | 555 | 579 | 542 | 552 |
| Crystallizing at 1,250° F. (5 min) | yes | yes | yes | yes | no | yes |
| Wt loss in 10 wt % citric acid at room temp. (mg/5 min/27 $cm^2$) | 0.2 | 1.0 | 0.3 | 0.7 | 2.31 | 100.7 |
| Wt loss in water at 80° C. (mg/50 hr/27 $cm^2$) | 0.6 | 0.2 | 1.3 | 0.5 | 33.0 | complete removal |
| Wt loss in alkalis at 88° C. (mg/2 hr/27 $cm^2$) | 32.1 | 35.8 | 34.8 | 17.7 | 30.0 | 443.0 (complete removal) |
| Wt loss in 0.1N $H_2SO_4$ at room temp. (mg/2 hr/27 $cm^2$) | 0.4 | 0.5 | 0.7 | 0.2 | 2.5 | complete removal |
| L Value | 60.48 | 15.30 | 12.45 | 15.12 | 67.02 | 61.97 |

Example 1 demonstrates that glass frits according to the present invention exhibit exceptional durability to acids, water, and alkalis as compared to known glass enamel frits. Example 1 also demonstrates that incorporation of coloring oxides into glass frits according to the present invention is effective in blocking the transmission of UV radiation and does not significantly degrade the durability of fired enamels. In the Examples contained herein fusion temperature concerns the minimum temperature at which the enamel particles flow together to give zero porosity without being able to scratch off from the glass coupon by a blade. Chemical durability involved the coating of 27 $cm^2$ (7 cm×3.8 cm) area of a glass coupons with about 40 microns of enamel. The coated coupons are heated at about 1250° F.

for 5–6 minutes. The coupon is then weighed, treated in the appropriate chemical solution for the specified length of time and temperature. At the end of treatment, the coupons are thoroughly washed in running water and scrubbed with tissue paper to remove any corroded layer. The coupons are then dried in an oven at about 185° F. for about 30 minutes. Upon cooling, the coupons are reweighed.

EXAMPLE 2

Glass frits A, B, C, and D were prepared using conventional glass making techniques such that they had the following compositions by weight percent:

| Oxide | A | B | C | D |
|---|---|---|---|---|
| $Bi_2O_3$ | 70.33 | 62.79 | 58.61 | 58.61 |
| $SiO_2$ | 21.25 | 18.97 | 17.71 | 17.71 |
| $Nb_2O_5$ | 3.10 | 2.77 | 2.58 | 2.58 |
| $Li_2O$ | 0.50 | 0.45 | 0.42 | 0.42 |
| $K_2O$ | 0.97 | 0.87 | 0.81 | — |
| BaO | 1.48 | 1.32 | 1.23 | 2.04 |
| ZnO | 2.37 | 2.12 | 1.97 | 1.97 |
| $Cr_2O_3$ | — | 4.46 | 4.17 | 4.17 |
| CuO | — | 4.46 | — | — |
| $Co_3O_4$ | — | 1.79 | — | — |
| $MnO_2$ | — | — | 12.50 | 12.50 |
| Total | 100.0 | 100.0 | 100.0 | 100.0 |

Glass frits A, B, C, and D all fuse at temperatures of between 1,000° F. and 1,150° F. Glass frits A and B form $Bi_2SiO_5$ crystals upon firing at about 1,250° F. for about 5 minutes whereas glass frits C and D are noncrystallizing under such conditions. The incorporation of greater than about 5 percent by weight $MnO_2$ in glass frits C and D completely inhibits the formation of $Bi_2SiO_5$ crystals during firing in such frits.

Glass frits A, B, C, and D were each milled to an average particle size of from about 2 to about 6 microns. Glass enamel compositions 1 and 2 were then prepared by dispersing various amounts of Glass Frits A, B, C, and D and a pigment into a C31 medium and milling in a Mueller mill for about 10 minutes. The weight ratio of solids to medium was about 7.5. The solids portion of glass enamel compositions 1 and 2 had the following composition by weight percent:

| Solid | 1 | 2 |
|---|---|---|
| Glass Frit A | 35.0 | 40.0 |
| Glass Frit B | 10.0 | — |
| Glass Frit C | 39.8 | — |
| Glass Frit D | — | 44.8 |
| 1750 Pigment | 15.2 | 15.2 |
| (Ferro Corporation) | | |
| Total | 100.0 | 100.0 |

Glass enamel compositions 1 and 2 were each screen printed onto 5 cm by 10 cm by 4 mm thick automobile back light coupons using a 160 mesh screen to a wet print thickness of about 1.2 to about 1.6 mils. The compositions were dried in a forced air oven at about 185° F. for about 30 minutes. A 1 cm wide strip of a standard conductive silver composition available from DuPont Electronic Materials as Silver Paste 1992 which is commonly used to form buss bars on automotive glass was overprinted on the coupons to a thickness of about 1.5 mils then heat treated for about 4 to about 8 minutes in an oven held at 1,250° F.

Glass enamel compositions 1 and 2 had sufficiently crystallized within four to five minutes at 1,250° F. so as to become nonstick with respect to FIBERFRAX covered glass forming equipment.

After firing, glass enamel compositions 1 and 2 produced enamels which exhibited excellent resistance to acids, water, and alkalis. Moreover, the enamels exhibited a very dark black color which permitted 0% UV transmission and effectively hid the overprinted silver buss bar material from view from the opposite side of the glass coupons. Enamels formed from glass enamel compositions 1 and 2 exhibited the following properties as compared to an enamel formed from a standard glass enamel composition available from Ferro Corporation as AT3405:

| Property | 1 | 2 | AT3405 |
|---|---|---|---|
| Wt loss in 10 wt % citric acid at room temp. (mg/5 min/27 $cm^2$) | <1 | <1 | 88 |
| Wt loss in water at 80° C. (mg/50 hr/27 $cm^2$) | <3 | <4 | 26.2 |
| Wt loss in alkalis at 88° C. (mg/2 hr/27 $cm^2$) | 25.4 | 30.2 | complete removal |
| Wt loss in 0.1 N $H_2SO_4$ at room temp. (mg/2 hr/27 $cm^2$) | <0.5 | <0.5 | complete removal |
| CIE Tristimulus color Coordinates at 5 min (L/a/b) | 4.75/ −0.71/0.10 | 5.90/ −1.33/−0.85 | 5.58/ 0.50/0.70 |

Example 2 demonstrates that glass enamel compositions according to the present invention can be utilized in multiple frit systems to produce glass enamels that are nonstick within 4–5 minutes upon heating at about 1,250° F., that are highly effective in blocking the transmission of UV radiation, that are highly effective in hiding overprinted silver buss bars, and that exhibit a very dark black color. Moreover, glass enamel compositions according to the present invention exhibit unparalleled durability as compared to known glass enamel compositions.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A composition for use in producing a glass enamel comprising a solids portion including a lead and cadmium free glass composition, said lead and cadmium free glass composition comprising a crystallizable glass frit comprising from about 0.1 percent by weight to about 15 percent by weight $Nb_2O_5$, less than about 3 percent by weight alkali metal oxides, less than about 3 percent by weight ZnO, and precursors from which $Bi_2SiO_5$ crystals can be formed upon firing, said precursors comprising $Bi_2O_3$ and $SiO_2$, said glass component further comprising from about 0.01 percent to about 25 percent by weight coloring oxides.

2. The composition as in claim 1 wherein said $Bi_2O_3$ comprises from about 20 percent by weight to about 80 percent by weight of said crystallizable glass frit, said crystallizable glass frit comprises less than about 1 percent by weight $B_2O_3$ and said $SiO_2$ comprises from about 12 percent by weight to about 45 percent by weight of said crystallizable glass frit.

3. The composition as in claim 1 wherein said coloring oxides comprise by weight of the glass composition one or more components selected from the group consisting of up to about 5 percent by weight $CeO_2$, up to about 10 percent by weight $Co_3O_4$, up to about 10 percent by weight $Cr_2O_3$, up to about 15 percent by weight CuO, up to about 15 percent by weight $Fe_2O_3$, up to about 10 percent by weight $In_2O_3$, up to about 5 percent by weight $MnO_2$, up to about 5 percent by weight $MoO_3$, up to about 5 percent by weight NiO, up to about 10 percent by weight SnO and up to about 5 percent by weight $V_2O_5$.

4. The composition as in claim 1 wherein said crystallizable glass frit comprises from about 50 percent by weight to about 75 percent by weight $Bi_2O_3$, from about 15 percent by weight to about 30 percent by weight $SiO_2$, from about 1 percent by weight to about 10 percent by weight $Nb_2O_5$, less than about 3 percent by weight alkali metal oxides, less than about 3 percent by weight ZnO, from about 0 percent by weight to about 5 percent by weight BaO, and up to about 0.5 percent by weight $B_2O_3$.

5. The composition as in claim 1 wherein said coloring oxides comprise one or more components selected from the group consisting of $CeO_2$, $Co_3O_4$, $In_2O_3$, SnO, $Cr_2O_3$, CuO, $Fe_2O_3$, $MnO_2$, $MoO_3$, NiO and $V_2O_5$.

6. The composition as set forth in claim 1 further comprising a lead and cadmium free noncrystallizable glass frit, said lead and cadmium free noncrystallizable glass frit comprising from about 20 percent by weight to about 80 percent by weight $Bi_2O_3$, from about 12 percent by weight to about 45 percent by weight $SiO_2$, from about 0.1 percent by weight to about 15 percent by weight $Nb_2O_5$, less than about 3 percent by weight alkali metal oxides, less than about 3 percent by weight ZnO, less than about 1 percent by weight $B_2O_3$, and from about 5 percent by weight to about 25 percent by weight $MnO_2$.

7. The composition as in claim 6 wherein said coloring oxides comprise up to about 25 percent by weight of said lead and cadmium free glass composition, said coloring oxides comprising by weight of the glass composition one or more components selected from the group consisting of up to about 5 percent by weight $CeO_2$, up to about 25 percent by weight $MnO_2$, up to about 10 percent by weight $Co_3O_4$, up to about 10 percent by weight $Cr_2O_3$, up to about 15 percent by weight CuO, up to about 15 percent by weight $Fe_2O_3$, up to about 5 percent by weight $MoO_3$, up to about 5 percent by weight NiO, and up to about 5 percent by weight $V_2O_5$.

8. The composition as in claim 6 wherein said noncrystallizable glass frit comprises from about 50 percent by weight to about 75 percent by weight $Bi_2O_3$, from about 15 percent by weight to about 30 percent by weight $SiO_2$, from about 1 percent by weight to about 10 percent by weight $Nb_2O_5$, less than about 3 percent by weight alkali metal oxides, less than about 3 percent by weight ZnO, from about 0 percent by weight to about 5 percent by weight BaO, up to about 0.5 percent by weight $B_2O_3$, and from about 10 percent by weight to about 25 percent by weight $MnO_2$.

9. The composition as in claim 1 wherein said solids portion includes a filler and a pigment.

10. A composition which upon firing produces a glass enamel, said composition comprising a solids portion and a vehicle, said solids portion comprising from about 5 percent by weight to about 100 percent by weight of one or more lead and cadmium free crystallizable glass frits, from about 0 percent by weight to about 95 percent by weight of one or more lead and cadmium free noncrystallizable glass frits, up to about 30 percent by weight of inorganic pigments, and up to about 25 percent by weight of crystalline fillers, said one or more lead and cadmium free crystallizable glass frits comprising from about 0.1 percent by weight to about 15 percent by weight $Nb_2O_5$, less than about 3 percent by weight alkali metal oxides, less than about 3 percent by weight ZnO, less than about 1 percent by weight $B_2O_3$, and precursors from which $Bi_2SO_5$ crystals can be formed upon firing, said precursors comprising $Bi_2O_3$ and $SiO_2$.

11. The composition as in claim 10 wherein said one or more lead and cadmium free noncrystallizable glass frits comprises from about 20 percent by weight to about 80 percent by weight $Bi_2O_3$, from about 12 percent by weight to about 45 percent by weight $SiO_2$, from about 0.1 percent by weight to about 15 percent by weight 205, less than about 3 percent by weight alkali metal oxides, less than about 3 percent by weight ZnO, less than about 1 percent by weight $B_2O_3$, and from about 5 percent by weight to about 25 percent by weight $MnO_2$.

12. The composition as in claim 10 wherein said lead and cadmium free noncrystallizable and glass frits further comprise up to about 25 percent by weight based on the weight of the glass frits of coloring oxides, said coloring oxides being one or more selected from the group consisting of up to about 5 percent by weight $CeO_2$, up to about 10 percent by weight $Co_3O_4$, up to about 10 percent by weight SnO, up to about 10 percent by weight $In_2O_3$, up to about 10 percent by weight $Cr_2O_3$, up to about 15 percent by weight CuO, up to about 15 percent by weight $Fe_2O_3$, up to about 25 percent by weight $MnO_2$, up to about 5 percent by weight $MoO_3$, up to about 5 percent by weight NiO, a nd up to about 5 percent by weight $V_2O_5$.

13. The composition as in claim 10 wherein said solids portion further comprises up to 3 percent by weight of fine silicon powder.

14. A method of applying an enamel to a formed section of glass, said method comprising the steps of providing a section of glass, providing a composition which forms an enamel upon firing at from about 1,050° F. to about 1,300° F. for less than about 5 minutes, said composition comprising a glass composition comprising one or more glass frits, said glass composition comprising from about 0.1 percent by weight to about 15 percent by weight $Nb_2O_5$, less than about 3 percent by weight alkali metal oxides, less than about 3 percent by weight ZnO, less than about 1 percent by weight $B_2O_3$, and precursors from which $Bi_2SiO_5$ crystals can be formed upon firing, said precursors comprising $Bi_2O_3$ and $SiO_2$, applying said composition to said section of glass, and heating said section of glass with said composition disposed thereon to from about 1,050° F. to about 1,300° F. for less than about 5 minutes and forming said section of glass.

15. A formed section of glass having an enamel fired thereon, said enamel having been formed by firing a composition comprising a solids portion and a vehicle portion, said solids portion comprising from about 5 percent by weight to about 100 percent by weight of one or more lead and cadmium free crystallizable glass frits, from about 0 percent by 10 weight to about 95 percent by weight of one or more lead and cadmium free noncrystallizable glass frits, and up to about 30 percent by weight of inorganic pigments, said lead and cadmium free crystallizable glass frits comprising from about 0.1 percent by weight to about 15 percent by weight $Nb_2O_5$, less than about 3 percent by weight alkali metal oxides, less than about 3 percent by weight ZnO, less than about 1 percent by weight $B_2O_3$, and precursors from which $Bi_2SiO_5$ crystals can be formed upon firing, said precursors comprising $Bi_2O_3$ and $SiO_2$.

* * * * *